Nov. 1, 1955          F. A. CABELL          2,722,140

PRESSURE ACTUATED HYDRAULIC DIFFERENTIAL CONTROL MECHANISM

Filed Feb. 2, 1954          4 Sheets-Sheet 2

Foraker A. Cabell
INVENTOR.

BY *Clarence A. O'Brien*
*and Harvey B. Jacobson*
Attorneys

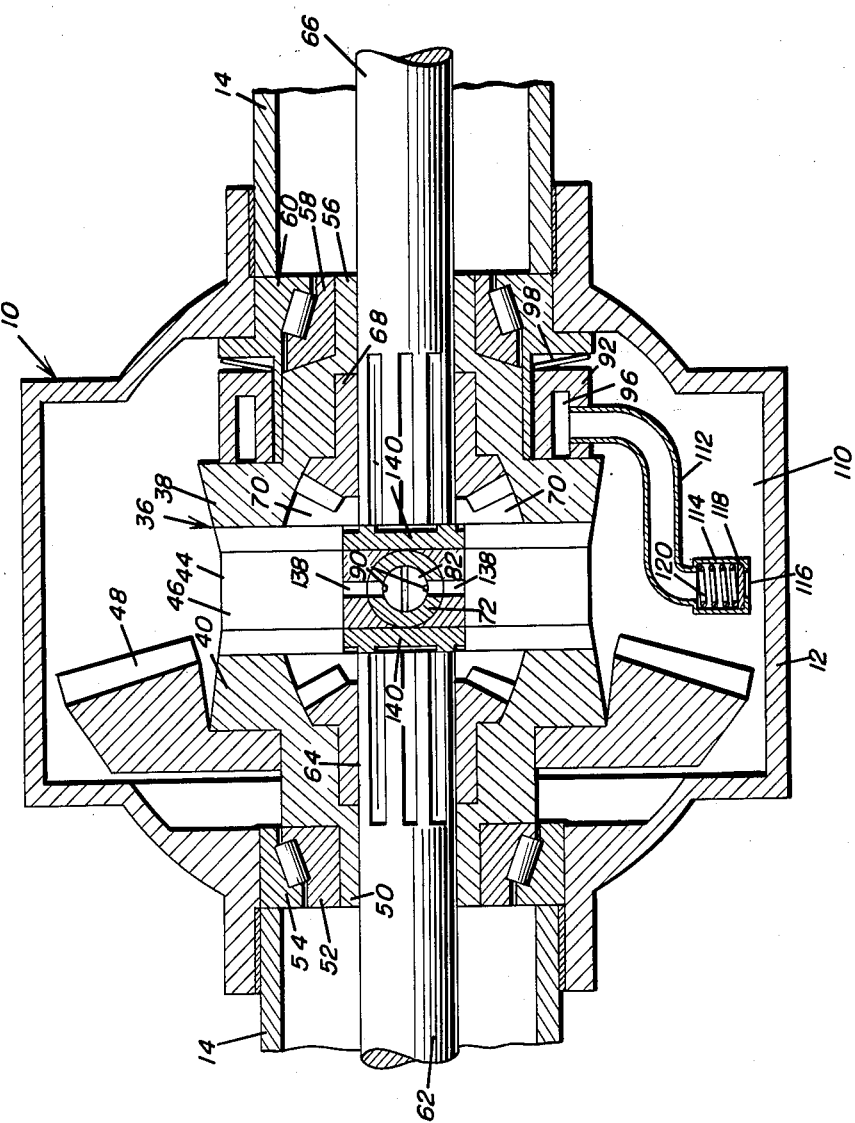

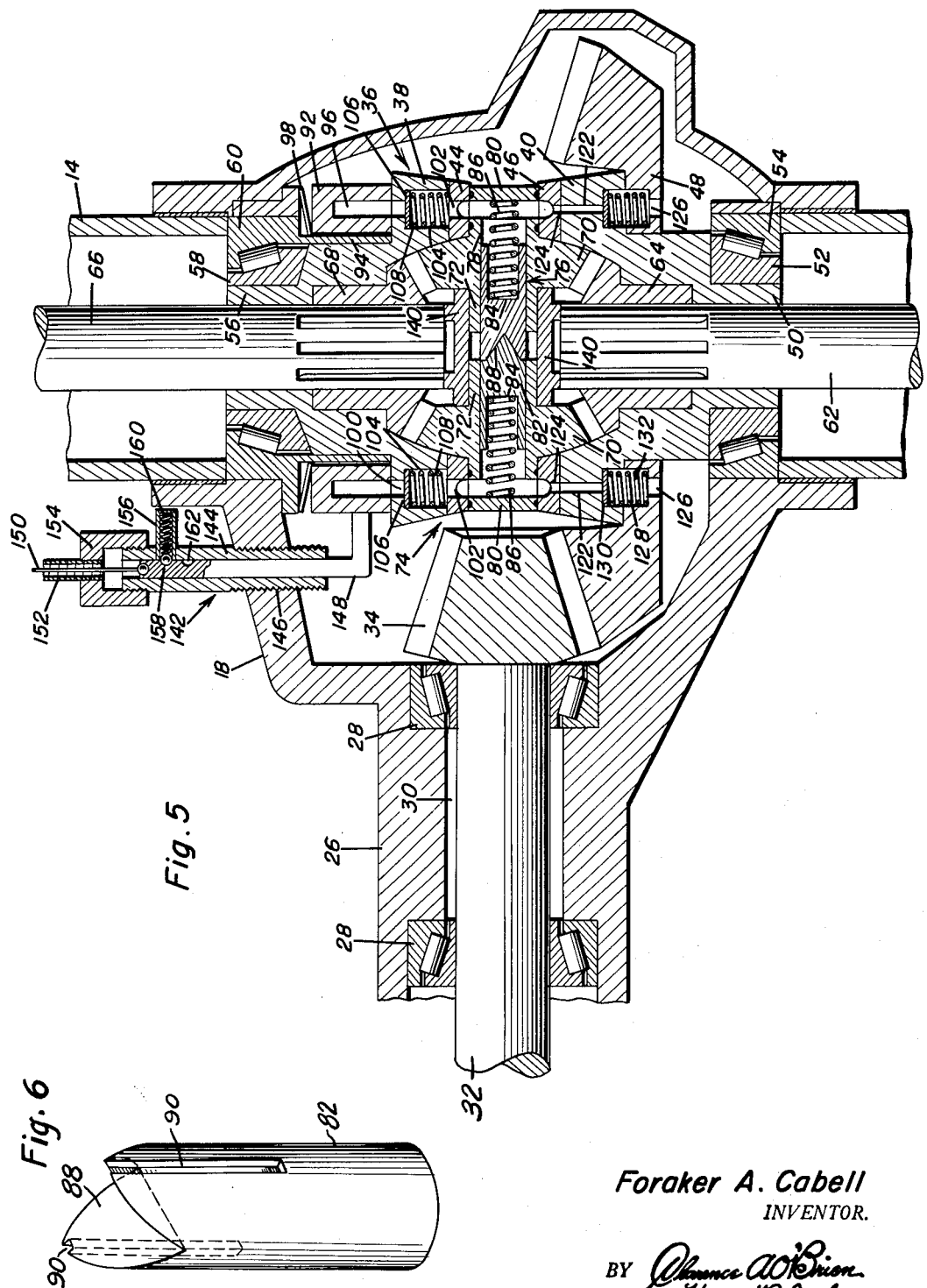

2,722,140

PRESSURE ACTUATED HYDRAULIC DIFFERENTIAL CONTROL MECHANISM

Foraker A. Cabell, Nashville, Tenn.

Application February 2, 1954, Serial No. 407,644

13 Claims. (Cl. 74—711)

This invention relates in general to improvements in a vehicle differential gear train, and is an improvement on my copending application, Serial No. 290,552, filed May 28, 1952.

The conventional differential of an automotive vehicle consists substantially of an arrangement of gears forming an epicyclic gear train which normally connects the rear axles of a vehicle in a straight line for unitary movement in response to driving rotation of a drive shaft in such vehicle. However, the coupling between the two rear axles of the vehicle is of such a nature whereby one rear axle may revolve faster than the other rear axle to permit the driving of a vehicle around a turn without necessitating slippage of one of the rear wheels. While this is extremely beneficial, in certain instances, particularly in the case of slippery road conditions, it is highly desirable that there be provided means for locking up the differential gear train so that relative movement of one axle with respect to the other is either prevented or greatly reduced thereby eliminating wheel spin and the loss of traction.

It is therefore the primary object of this invention to provide a hydraulic differential control mechanism for permitting the regulated differential action of the rear axle differential assembly at lower vehicle speeds whereby wheel slippage and spin at low speed is eliminated.

Another object of this invention is to provide a hydraulic fluid governor which is automatic in operation so as to permit normal differential action of a differential gear assembly and at the same time which will permit relative locking or restraining of the differential gear train at low speeds so that normal differential action may occur at relatively high speeds and at the same time a relatively locked rear wheel drive assembly may be provided at lower speeds.

Heretofore there have been provided means for selectively or automatically locking rear axles of vehicles with respect to each other so that the differential action thereof is eliminated. However, it has been found that complete locking of the differential action is extremely undesirable and that the most effective differential control is through the use of a hydraulic control system which will permit restrained, but limited rotation of one rear axle with respect to the other, with the relative rotation of the rear axles being governed by a governor. Many attempts have been made to simplify such a differential control mechanism. The differential control mechanism disclosed in my above mentioned application greatly reduced the bulkiness of such a differential control mechanism. However, it did require the provision of many extra elements thereby necessarily increasing the cost of the mechanism.

It is another object of this invention to provide an extremely simple hydraulic differential control mechanism for controlling the differential action of a differential gear assembly, the differential control mechanism being extremely simple in construction and operation whereby not only is the initial cost of the differential control mechanism low, but the life thereof is extended and replacement costs extremely low.

A further object of this invention is to provide a hydraulic differential control mechanism for controlling the differential action of a differential gear train, the differential control mechanism being normally automatic in operation and having means for selectively rendering the differential control mechanism inoperative.

A still further object of this invention is to provide an improved hydraulic differential control mechanism which may be incorporated in existing vehicle differentials with a replacement of a minimum of parts.

These together with other objects and advantages which will become subsequently apparent reside in the details of construction and operation as more fully hereinafter described and claimed, reference being made to the accompanying drawings forming a part hereof, wherein like numerals refer to like parts throughout, and in which:

Figure 3 is a fragmentary vertical sectional view, similar to Figure 2 and shows the pistons of the pump mechanism retained in inoperative positions by centrifugal forces imposed thereon due to the rotation of the differential gear case in which the pump mechanism is mounted;

Figure 1:
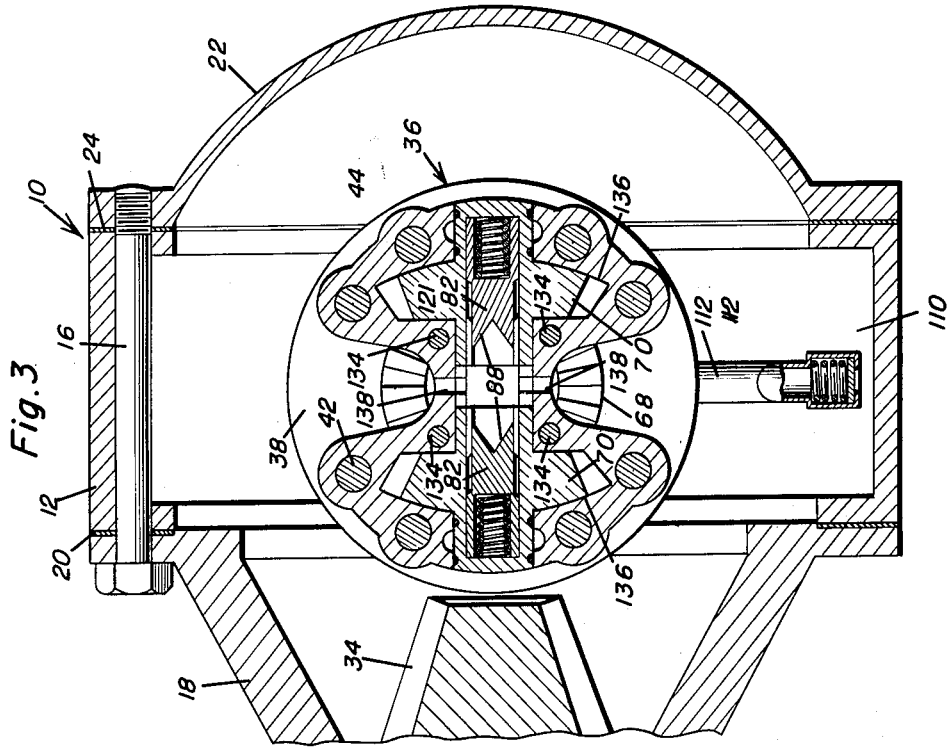
Figure 1 is a top plan view of a central portion of a vehicle differential assembly which shows the relationship of a control cable for the hydraulic differential control mechanism which forms a part thereof with respect to the rear axle gear case.
Figure 2:
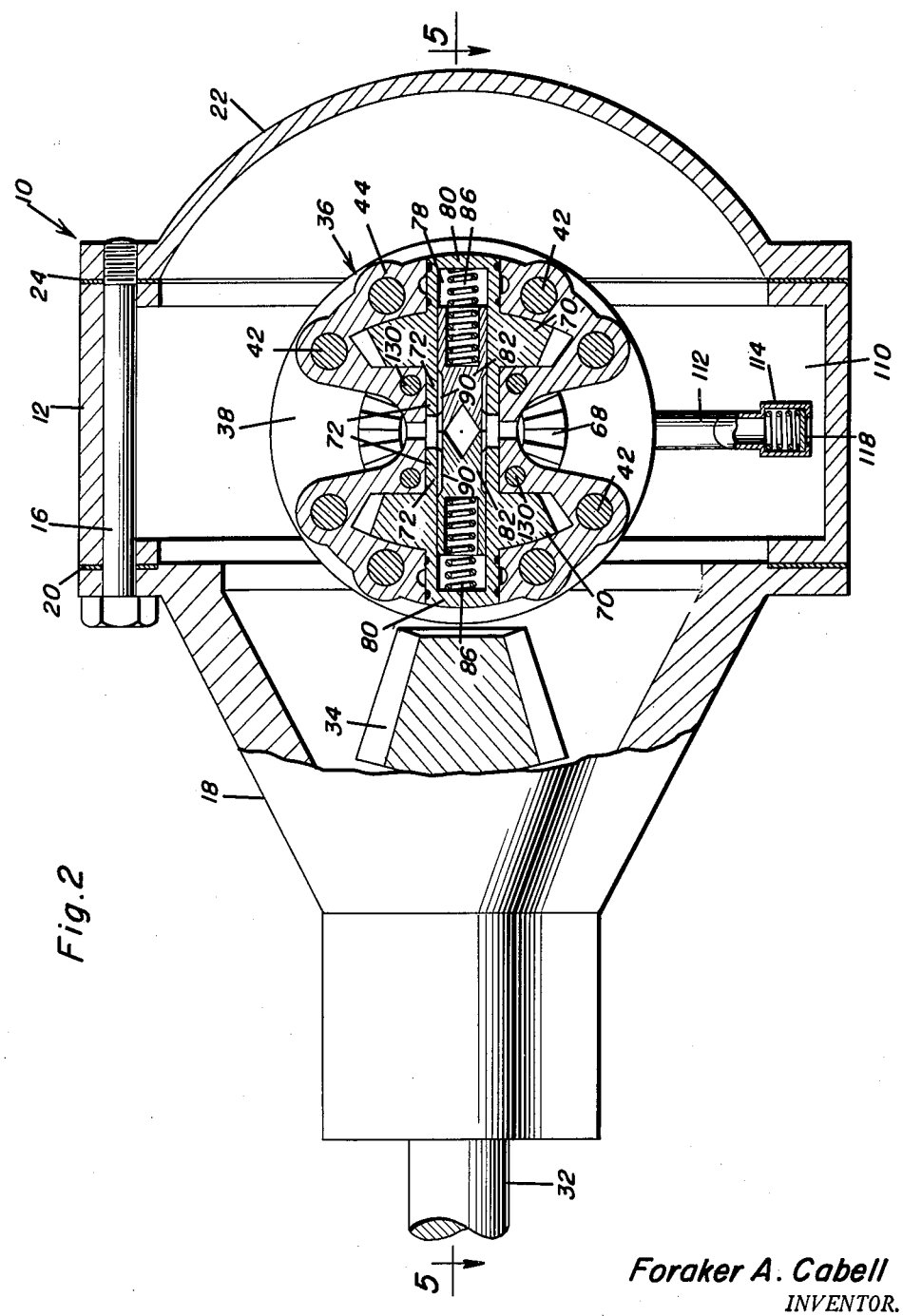
Figure 2 is an enlarged longitudinal vertical sectional view taken substantially upon the plane indicated by the section line 2—2 of Figure 1 and shows the internal construction of the hydraulic differential control mechanism, pistons of a pump unit being shown in the innermost positions of their stroke.

Figure 4 is an enlarged fragmentary transverse vertical sectional view taken substantially upon the plane indicated by the section line 4—4 of Figure 1 and shows the relationship of various portions of the differential gear chain and the differential control mechanism including the manner in which lubricants from within the rear axle gear case is supplied to the pump by the differential control mechanism;

Figure 5 is an enlarged fragmentary horizontal sectional view taken substantially upon the plane indicated by the section line 5—5 of Figure 2 and shows the specific construction of the hydraulic differential control mechanism and the operating means therefor; and Figure 6 is an enlarged rotated perspective view of one of the pistons and shows the details of the cam surface thereof.

Referring now to the drawings in detail, it will be seen that there is illustrated a rear axle gear case which is referred to in general by the reference numeral 10. The rear axle gear case 10 includes a central housing 12 which has extending from opposite ends thereof axle housings 14, the central housing 12 extending transversely of a vehicle for which it is intended. Removably secured to the forward side of the central housing 12 by bolts 16 is a differential drive pinion shaft carrier 18. The differential drive pinion shaft carrier 18 is sealed with respect to the central housing 12 by a gasket 20. The bolts 16 also secure to the central housing 12 a removable rear cover 22. The rear cover 22 is sealed with respect to the central housing 12 by a gasket 24.

As is best illustrated in Figure 5, the differential drive pinion shaft carrier 18 includes a forward tubular portion 26. The tubular portion 26 has seated therein spaced bearings 28 which are separated by a bearing spacer 30. Rotatably journaled within the bearings 28 and extending forwardly out of the differential drive pinion shaft carrier 18 is a differential drive pinion shaft 32. The differential drive pinion shaft 32 is provided at its rear end with an integral differential drive pinion gear 34.

Mounted within the central housing 12 of the rear axle gear case 10 is a differential gear case which is referred to in general by the reference numeral 36. The differential gear case 36 includes split halves 38 and 40 which are secured together in spaced relation by a plurality of bolts 42, Figure 3, which extend therethrough. The bolts 42 also extend through butterfly shaped bearing halves 44 and 46, which are best illustrated in Figures 2 and 3, disposed between the differential gear case halves 38 and 40. Mounted on the differential gear case half 40 and secured thereto by the bolts 42 is a ring gear 48, the ring gear 48 being in driven engagement with the drive pinion gear 34.

In order that the differential gear case 36 and the ring gear 48 may be mounted within the rear axle gear case 10 for rotation, the differential gear case half 40 is provided at its other end with a reduced portion 50 on which is mounted a bearing assembly 52 which includes a bearing cup 54 carried by the rear axle gear case 10. The differential gear case half 38 is also provided with a reduced outer end portion 56 which has mounted thereon a bearing assembly 58, the bearing assembly 58 including a bearing cup 60 which is carried by the rear axle gear case 10.

Extending through the differential gear case half 40 into the differential gear case 36 is a first axle 62. The axle 62 has splined thereon a side gear 64 of the differential gear train. The side gear 64 is journaled within the differential gear case half 40 for rotation independent thereof.

Also extending into the differential gear case 36, but passing through the differential gear case half 38 is a second axle 66. The axle 66 has splined on the inner end thereof a side gear 68. The side gear 68 is journaled within the differential gear case half 38 for rotation independently thereof.

Mounted within the differential gear case 36 and meshed with the side gears 64 and 68 are differential pinion gears 70. The differential pinion gears 70 include integral sleeves 72 which are longitudinally disposed in alignment and which are rotatably journaled within the bearings 44 and 46. It is to be understood that the side gears 64 and 68 and the differential pinion gears 70 rotate as a unit together with the axles 62 and 66 in the normal operation of a vehicle and that the gears 64, 68 and 70 rotate relative to each other only when there is a relative slippage between rear wheels of a vehicle (not shown) to which the axles 62 and 66 are attached in driving relation.

Carried by the differential gear case 36 and the components mounted therewithin is the hydraulic differential control mechanism which is the subject of this invention, the mechanism being referred to in general by the reference number 74. The hydraulic differential control mechanism 74 includes a pump assembly which is referred to in general by the reference numeral 76. The pump assembly 76 has a cylinder 78 formed by longitudinal bores in the sleeve 72 of the differential pinions 70. The bores forming the cylinder 78 do not extend through the forward and rear ends of the forward and rear ones of the sleeves 72, respectively, thereby forming cylinder heads 80 at opposite ends of the cylinder 78.

The pump assembly 76 also includes a pair of pistons 82, there being one piston mounted within each of the sleeves 72. The heads of the pistons 82 are provided with bores 84 in which are seated ends of coil springs 86. The coil springs have their opposite ends engaging the inner surfaces of the cylinder heads 80 and urging the pistons 82 toward each other. The pistons 82 are provided with drive means in the form of mating undulous cams 88.

In order that the pistons 82 may be reciprocated, they are connected to their respective sleeves 72 by spline connections 90, as best illustrated in Figure 2. Accordingly, when the differential pinions 70 are rotated, their respective pistons 82 will rotate with them. Inasmuch as the differential pinions 70 will rotate in opposite directions, the pistons 82 also rotate in opposite directions and due to the engagement of the undulous cams 88, the pistons will be initially urged away from each other from the position illustrated in Figure 5 until they assume the positions illustrated in Figure 2. Further rotation of the pistons 82 relative to each other will permit movement of the pistons 82 toward each other, due to the urgence of the springs 86. Thus it will be seen that when the differential pinions 70 rotate, the pistons 82 will be reciprocated within the cylinder 78.

In order that a suitable fluid may be supplied to the pump assembly 76, there is provided a fluid supply collar 92. The fluid supply collar 92 is carried by an inwardly projecting annular extension 94 of the bearing cup 60. The fluid supply collar 92 includes an annular fluid well 96 which opens toward the opposed portion of the differential gear case half 38. The fluid supply collar 92 is slidably mounted on the annular extension 94 and is retained in face to face engagement with the adjacent portion of the differential gear case half 48 by an annular spring member 98 which is disposed between an outer portion of the fluid supply collar 92 and an adjacent portion of the bearing cup 60.

Extending through the differential bearing case half 38 is a pair of fluid supply passages 100 which are communicated with the outer ends of the cylinder 78 through fluid supply passages 102 in the bearing half 44. In order that fluid may pass only into the pump assembly 76 through the fluid supply passages 100, each of the fluid supply passages 100 is provided with an enlarged portion 104 in which is mounted a check valve 106. The check valve 106 is spring loaded by a spring 108.

It is intended that the fluid pumped by the pump assembly 76 will be the lubricant carried within the rear axle gear case 10. In order that fluid may be drawn from a sump portion 110 of the central housing 12 up into the fluid supply collar 92, the fluid supply collar 92 is provided with a pick-up tube 114 whose shape is best illustrated in Figure 4. The pick-up tube 112 has the upper end thereof in communication with the fluid supply well 96 and the lower end thereof includes an enlarged housing portion 114. The lower end of the housing 114 is provided with an intake opening 116 which is closable by a check valve 118. The check valve 118 is spring loaded by a spring 120.

In order that the hydraulic differential control mechanism 74 may effectively operate, the pump assembly 76 is provided with a pair of fluid outlet passages 122. The fluid outlet passages 122 are aligned with the fluid inlet passages 100 and are communicated with the end portions of the cylinders 78 through outlet passages 124 in the bearing half 46. The fluid outlet passages 122 are restricted as compared to the fluid inlet passages 100 so that the operation of the pump assembly 76 is retained at a minimum. Through the provision of restricted fluid outlet passages, the reciprocation of the pistons 82 is restrained.

In order that the fluid outlet passages 122 may be communicated with the interior of the rear axle gear case 10, there is provided aligned fluid outlet passages 126 through the ring gear 48. The fluid outlet passages 122 and 126 include enlarged inner portions 128 in which are mounted check valves 130 to prevent the accidental drawing in of fluid through the fluid outlet passages 122. The check valves 130 are spring loaded by springs 132.

It is intended that the differential pinions 70 and the bearing halves 44 and 46 in which they are rotatably journaled, come as an assembly. The bearing halves 44 and 46 are secured together by screws 134 passing therethrough as is best illustrated in Figures 2 and 3. The bearing halves 44 and 46 are provided with openings 136 through which the differential pinion gears 70 pass for meshing engagement with the side gears 64 and 68. The central portions of the bearing halves 44 and 46 are provided with bores 138 which communicate with the central portion of the cylinder 78 to permit the breathing of air or lubricant trapped between the pistons 82 as they reciprocate. This permits the proper lubrication of the undulated cams 88.

Disposed generally within the confines of the bearing halves 44 and 46 are spacers 140. The spacers 140 are engaged by the inner ends of the axles 62 and 66 to limit inward movement thereof.

In the normal operation of the present invention, the rear axles 62 and 66 turn in unison and the differential control mechanism 74 does not function. However, when there is a relative rotation of one of the axles with respect to the other, the differential pinions 70 are rotated with the result that the pump assembly 76 is actuated to draw in lubricant from the sump 110 and to pump such lubricant back out to the fluid outlet passages 122. Inasmuch as the fluid outlet passages 122 are restricted as compared to the capacity of the pump assembly 76, it will be seen that the relative rotation of the differential pinion 70 will be greatly restrained. This will result in an effective locking of the axles 62 and 66 with respect to each other and at the same time permit a limited rotation of one axle with respect to the other so that a vehicle equipped with the hydraulic differential control mechanism 74 may negotiate corners at a low speed, and at the same time prevent relatively fast spinning of one axle with respect to the other. This is the primary purpose of the invention. The relative rate of pumping of the pump assembly 76 may be varied by the rate of reciprocation of the pistons 82 through the varying of the contour of the undulating cams 88. Inasmuch as the shafts 72 of the differential pinions 70 are rotating in opposite directions, the reciprocations of the pistons 82 for each rotation of an axle with respect to the other will be equal to twice the number of lobes on the individual cams 88.

It is to be understood that in the normal operation of the differential assembly described above, the differential gear case 36 and the components carried thereby rotate as a unit. This results in the rotation of the shafts 72 of the differential pinions 70 about a transverse axis passed through the center of the axles 62 and 66. At a predetermined speed, which may be governed by the properties of the springs 86, the pistons 82 are forced outwardly by centrifugal force to the positions illustrated in Figure 3. When the pistons 82 are in these positions, the pump assembly 76 is inoperative with the result that the hydraulic differential control mechanism 74 is automatically rendered inoperative. Therefore, while the differential control mechanism 74 provides for a substantially relative locking of the axles 62 and 66 with respect to each others low speeds, there is automatically no locking action of the axles at higher speed. Through experimentation it has been found that if the springs 86 are of such a nature whereby the pump assembly 76 is rendered inoperative when the vehicle has attained a speed of fifteen miles per hour, the efficiency of the hydraulic differential control mechanism 74 is that desired. However, various types of springs 86 may be utilized to produce results as may be required by different persons under specific conditions.

From the foregoing description of the hydraulic differential control mechanism 74, it will be seen that it is automatic in operation. However, under certain conditions it is desirable that the axles 62 and 66 not be relatively locked with respect to each other at low speeds. It therefore may be desirable to provide the hydraulic differential control mechanism 74 with a manually controlled lock out device, this device being referred to in general by the reference numeral 142. The lock out device 142 includes a sleeve 144 which is threaded through an internally threaded bore 146 in the differential drive pinion shaft carrier 18, as is best illustrated in Figure 5. Carried by the sleeve 144 for sliding movement therethrough is an L-shaped arm 148 which has one end thereof secured to the fluid supply collar 92. The other end of the arm 148 is disposed within the sleeve 144 and connected to a flexible cable 150. The cable 150 passes through a flexible housing 152 which has a rear end thereof secured to a cap 154 which is removably connected to the outer end of the sleeve 144. The other end of the flexible cable 150 (not shown) may be positioned in a driver's compartment and operated by a control device (not shown) as desired by the operator of the vehicle to which the hydraulic differential control mechanism 74 is attached.

In order that the arm 148 may be retained in a selected position, the sleeve 144 is provided with a tube 156 which extends transversely thereof. The sleeve 156 has mounted therein a ball 158 which is spring urged toward the arm 148 by a spring 160 carried by the tube 156. The ball 158 is selectively positioned in a pair of recesses 162 in the arm 148, the recesses being disposed for properly positioning the arm 148 for retaining the fluid supply collar 92 in either a fluid supplying position or a spaced position with respect to the fluid inlet passages 100.

It is to be understood that when the fluid supply collar 92 is retained in spaced relation with respect to the fluid inlet passages 100 through the positioning of the arm 148, no lubricant is provided for the pump assembly 76 and it is thereby rendered inoperative even though the pistons 82 may be reciprocated as a result of rotation of the differential pinions 70.

In view of the foregoing, it will be seen that the control mechanism is of such a nature whereby there is an equal distribution of stress to all differential and rear axle parts and the control mechanism is able to handle any or all of the torque developed by a vehicle's motor even though all of this torque may be suddenly imposed on only one of the vehicle's driven wheels.

From the foregoing, it will be seen that there has been described and illustrated an effective and relatively simple hydraulic differential control mechanism which is automatic in operation, but may be selectively overridden to substantially lock rear axles of a vehicle relative to each other at low speeds so as to eliminate wheel spin slippage.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A fluid governor for controlling differential action of a rear axle differential having differential pinion gears, said governor including a lubricant pump positively driven by said differential pinion gears in response to rotation thereof, means for restricting flow of lubricant from said pump, whereby rotation of said differential pinion gears is controlled, said pump including a cylinder, pistons mounted within said cylinder for opposite sliding and revolving movement, drive means interconnecting said pistons within said cylinder, said drive means including mating opposed cam surfaces on said piston, whereby opposite revolving of said pistons results in sliding movement of said pistons.

2. A fluid governor for controlling differential action of a rear axle differential having differential pinion gears, said governor including a lubricant pump positively driven by said differential pinion gears in response to rotation thereof, means for restricting flow of lubricant from said pump, whereby rotation of said differential pinion gears is controlled, said pump including a cylinder, pistons mounted within said cylinder for opposite sliding and revolving movement, drive means interconnecting said pistons within said cylinder, said drive means being opposed cam surfaces on ends of said pistons, springs disposed within opposite ends of said cylinder engaging said piston to urge said pistons toward each other, said springs being overridable by centrifugal force on said pistons to permit said pistons to be retained in inoperative positions at ends of said cylinder.

3. A fluid governor for controlling differential action of a rear axle differential having differential pinion gears, said governor including a lubricant pump positively driven by said differential pinion gears in response to rotation thereof, means for restricting flow of lubricant from said pump, whereby rotation of said differential pinion gears is controlled, said pump including a cylinder, pistons mounted within said cylinder for opposite sliding and revolving movement, drive means interconnecting said pistons within said cylinder, said drive means being opposed cam surfaces on ends of said pistons, said differential pinion gears including opposed aligned sleeves, said sleeves being hollow and forming said cylinder.

4. A fluid governor for controlling differential action of a rear axle differential having differential pinion gears, said governor including a lubricant pump positively driven by said differential pinion gears in response to rotation thereof, means for restricting flow of lubricant from said pump, whereby rotation of said differential pinion gears is controlled, said pump including a cylinder, pistons mounted within said cylinder for opposite sliding and revolving movement, drive means interconnecting said pistons within said cylinder, said drive means being opposed cam surfaces on the ends of said pistons, said differential pinion gears including opposed aligned sleeves, said sleeves being hollow and forming said cylinder, said pistons being secured to said sleeves for revolving therewith and reciprocation therein.

5. A fluid governor for controlling differential action of a rear axle differential having differential pinion gears, said governor including a lubricant pump positively driven by said differential pinion gears in response to rotation thereof, means for restricting flow of lubricant from said pump, whereby rotation of said differential pinion gears is controlled, said pump including a cylinder, pistons mounted within said cylinder for opposite sliding and revolving movement, drive means interconnecting said pistons within said cylinder, said drive means being opposed cam surfaces on the ends of said pistons, said differential pinion gears including opposed aligned sleeves, said sleeves being hollow and forming said cylinder, said pistons being secured to said sleeves for revolving therewith and reciprocation therein, said drive means including mating opposed cam surfaces on said piston, whereby opposite revolving of said pistons results in sliding movement of said pistons.

6. A fluid governor for controlling differential action of a rear axle differential of the type including a differential gear case, said differential gear case including opposed halves, differential pinion gears mounted within said differential gear case, said governor including a lubricant pump mounted within said differential gear case and positively driven by said differential pinion gears, means for restricting flow of lubricant from said pump whereby revolving of said differential pinion gears is restrained, a lubricant inlet passage in one of said differential gear case halves for supplying lubricant to said pump, a fixed lubricant supply collar engaging said one differential gear case half, a lubricant pick-up tube connected to and carried by said lubricant supply collar, said lubricant supply collar communicating said lubricant pick-up tube with said lubricant inlet passage.

7. A fluid governor for controlling differential action of a rear axle differential of the type including a differential gear case, said differential gear case including opposed halves, differential pinion gears mounted within said differential gear case, said governor including a lubricant pump mounted within said differential gear case and positively driven by said differential pinion gears, means for restricting flow of lubricant from said pump whereby revolving of said differential pinion gears is restrained, a lubricant inlet passage in one of said differential gear case halves for supplying lubricant to said pump, a fixed lubricant supply collar engaging said one differential gear case half, a lubricant pick-up tube connected to and carried by said lubricant supply collar, said lubricant supply collar communicating said lubricant pick-up tube with said lubricant inlet passage, said lubricant supply collar being spring urged into engagement with said one differential gear case half, means connected to said lubricant supply collar to position said lubricant supply collar remote from said one differential gear case half to render said pump ineffective.

8. A fluid governor for controlling differential action of a rear axle differential of the type including a differential gear case, said differential gear case including opposed halves, differential pinion gears mounted within said differential gear case, said governor including a lubricant pump mounted within said differential gear case and positively driven by said differential pinion gears, means for restricting flow of lubricant from said pump whereby revolving of said differential pinion gears is restrained, a lubricant inlet passage in one of said differential gear case halves for supplying lubricant to said pump, a fixed lubricant supply collar engaging said one differential gear case half, a lubricant pick-up tube connected to and carried by said lubricant supply collar, said lubricant supply collar communicating said lubricant pick-up tube with said lubricant inlet passage, said means being in the form of a restricted lubricant outlet passage in the other of said differential gear case halves.

9. A fluid governor for controlling differential action of a rear axle differential of the type including a differential gear case, said differential gear case including opposed halves, differential pinion gears mounted within said differential gear case, said governor including a lubricant pump mounted within said differential gear case and positively driven by said differential pinion gears, means for restricting flow of lubricant from said pump whereby revolving of said differential pinion gears is restricted, said pump including a cylinder, pistons mounted within said cylinder for opposite sliding and revolving movement, drive means interconnecting said pistons within said cylinder, said drive means being mating opposed cam surfaces on said pistons.

10. A fluid governor for controlling differential action of a rear axle differential of the type including a differential gear case, said differential gear case including opposed halves, differential pinion gears mounted within said differential gear case, said governor including a lubricant pump mounted within said differential gear case and positively driven by said differential pinion gears, means for restricting flow of lubricant from said pump whereby revolving of said differential pinion gears is restricted, said pump including a cylinder, pistons mounted within said cylinder for opposite sliding and revolving movement, drive means interconnecting said pistons within said cylinder, said drive means being mating opposed cam surfaces on said pistons, said pump being mounted within said differential pinion gears, differential pinion gear bearings disposed between said differential gear case halves, said bearings having lubricant passages therein.

11. A fluid governor for controlling differential action of a rear axle differential of the type including a differential gear case, said differential gear case including opposed halves, differential pinion gears mounted within said differential gear case, said governor including a lubricant pump mounted within said differential gear case and positively driven by said differential pinion gears, means for restricting flow of lubricant from said pump whereby revolving of said differential pinion gears is restricted, said pump including a cylinder, pistons mounted within said cylinder for opposite sliding and revolving movement, drive means interconnecting said pistons within said cylinder, said drive means including mating opposed cam surfaces on said piston, whereby opposite revolving of said pistons results in sliding movement of said pistons.

12. A fluid governor for controlling differential action of a rear axle differential of the type including a differential gear case, said differential gear case including opposed halves, differential pinion gears mounted within said differential gear case, said governor including a lubricant pump mounted within said differential gear case and positively driven by said differential pinion gears, means for restricting flow of lubricant from said pump whereby revolving of said differential pinion gears is restricted, said pump including a cylinder, pistons mounted within said cylinder for opposite sliding and revolving movement, drive means interconnecting said pistons within said cylinder, said drive means being mating opposed cam surfaces on said pistons, said pump being mounted with said differential pinion gears, said differential pinion gears including opposed aligned sleeves, said sleeves being hollow and forming said cylinder.

13. A fluid governor for controlling differential action of a rear axle differential of the type including a differential gear case, said differential gear case including opposed halves, differential pinion gears mounted within said differential gear case, said governor including a lubricant pump mounted within said differential gear case and positively driven by said differential pinion gears, means for restricting flow of lubricant from said pump whereby revolving of said differential pinion gears is restricted, said pump including a cylinder, pistons mounted within said cylinder for opposite sliding and revolving movement, drive means interconnecting said pistons within said cylinder, said drive means being mating opposed cam surfaces on said pistons, said pump being mounted within said differential pinion gears, said differential pinion gears including opposed aligned sleeves, said sleeves being hollow and forming said cylinder, said pistons being secured to said sleeves for revolving therewith and reciprocation therein.

References Cited in the file of this patent

UNITED STATES PATENTS

| | | |
|---|---|---|
| 1,529,942 | Bradley | Mar. 17, 1925 |
| 1,916,715 | Corey | July 4, 1933 |
| 2,375,938 | Moon | May 15, 1945 |
| 2,627,190 | Bottcher | Feb. 3, 1953 |
| 2,650,507 | Clintsman | Sept. 1, 1953 |
| 2,655,055 | Bottcher | Oct. 13, 1953 |

FOREIGN PATENTS

| | | |
|---|---|---|
| 679,643 | Germany | Aug. 12, 1939 |